(12) United States Patent
Dyson, III

(10) Patent No.: US 10,675,491 B2
(45) Date of Patent: Jun. 9, 2020

(54) CHRISTMAS TREE FIRE EXTINGUISHING AND ALERT SYSTEM

(71) Applicant: William E. Dyson, III, Washington, DC (US)

(72) Inventor: William E. Dyson, III, Washington, DC (US)

( * ) Notice: Subject to any disclaimer, the term of this patent is extended or adjusted under 35 U.S.C. 154(b) by 0 days.

(21) Appl. No.: 14/052,817

(22) Filed: Oct. 14, 2013

(65) Prior Publication Data

US 2014/0138107 A1 May 22, 2014

Related U.S. Application Data

(60) Provisional application No. 61/727,156, filed on Nov. 16, 2012.

(51) Int. Cl.
| | | |
|---|---|---|
| *A62C 3/00* | (2006.01) | |
| *A62C 37/50* | (2006.01) | |
| *A62C 35/00* | (2006.01) | |
| *A62C 37/10* | (2006.01) | |
| *G01F 23/24* | (2006.01) | |
| *G08B 17/10* | (2006.01) | |
| *A62C 35/58* | (2006.01) | |
| *A62C 13/64* | (2006.01) | |
| *G08B 21/14* | (2006.01) | |
| *A62C 37/36* | (2006.01) | |
| *A62C 31/22* | (2006.01) | |

(52) U.S. Cl.
CPC ............... *A62C 3/008* (2013.01); *A62C 3/00* (2013.01); *A62C 13/64* (2013.01); *A62C 31/22* (2013.01); *A62C 35/00* (2013.01); *A62C 35/58* (2013.01); *A62C 37/10* (2013.01); *A62C 37/36* (2013.01); *A62C 37/50* (2013.01); *G01F 23/243* (2013.01); *G08B 17/10* (2013.01); *G08B 21/14* (2013.01)

(58) Field of Classification Search
CPC ......... A62C 37/50; A62C 37/10; A62C 37/36; A62C 35/00; A62C 35/58; A62C 3/008; A62C 3/00; A62C 13/64; A62C 31/22; G01F 23/243; G08B 17/10; G08B 21/14
USPC ........ 169/13, 23, 26, 29, 16, 56, 60, 61, 54, 169/70; 340/620, 628, 632
See application file for complete search history.

(56) References Cited

U.S. PATENT DOCUMENTS

| | | |
|---|---|---|
| 2,522,020 A | 9/1950 | Deyo |
| 5,018,586 A | 5/1991 | Cawley et al. |
| 5,031,702 A | 7/1991 | Trumbach |
| 5,040,610 A | 8/1991 | Blanchong |

(Continued)

*Primary Examiner* — Steven J Ganey
(74) *Attorney, Agent, or Firm* — Boudwin Intellectual Property; Daniel Boudwin

(57) ABSTRACT

A Christmas tree fire extinguishing system is provided, wherein an automatically initiated fire extinguishing agent is contained within a housing below the tree and a plurality of smoke and heat sensors communicate to a control unit. The control unit controls the trigger and interprets the sensor signals, while also sending signals to a communications system upon a fire event to notify the homeowner and/or the local fire authorities. In combination with the fire extinguishing agent, the system can monitor the tree and alert property authorities in the event of a fire to prevent home fires and major property damage. Also provided is an audible fire alert for those in the home, wherein a sound generator is energized if smoke or fire is detected to warn those in the immediate vicinity.

8 Claims, 3 Drawing Sheets

(56) References Cited

U.S. PATENT DOCUMENTS

| | | | |
|---|---|---|---|
| 6,003,610 A | 12/1999 | Kordes | |
| 7,679,521 B1* | 3/2010 | Gavia et al. | 340/628 |
| 7,878,258 B2* | 2/2011 | Lindstrom | A62C 35/02 |
| | | | 169/61 |
| 7,963,343 B1 | 6/2011 | Hopkins | |
| 8,517,117 B2* | 8/2013 | Mikulec | A62C 3/006 |
| | | | 169/60 |
| 2003/0023714 A1* | 1/2003 | Ziegler | H04M 3/08 |
| | | | 709/224 |
| 2008/0055098 A1* | 3/2008 | Toland | 340/628 |
| 2008/0271902 A1* | 11/2008 | Johnson et al. | 169/56 |
| 2009/0060160 A1* | 3/2009 | Kassas | H04L 12/1895 |
| | | | 379/207.02 |

* cited by examiner

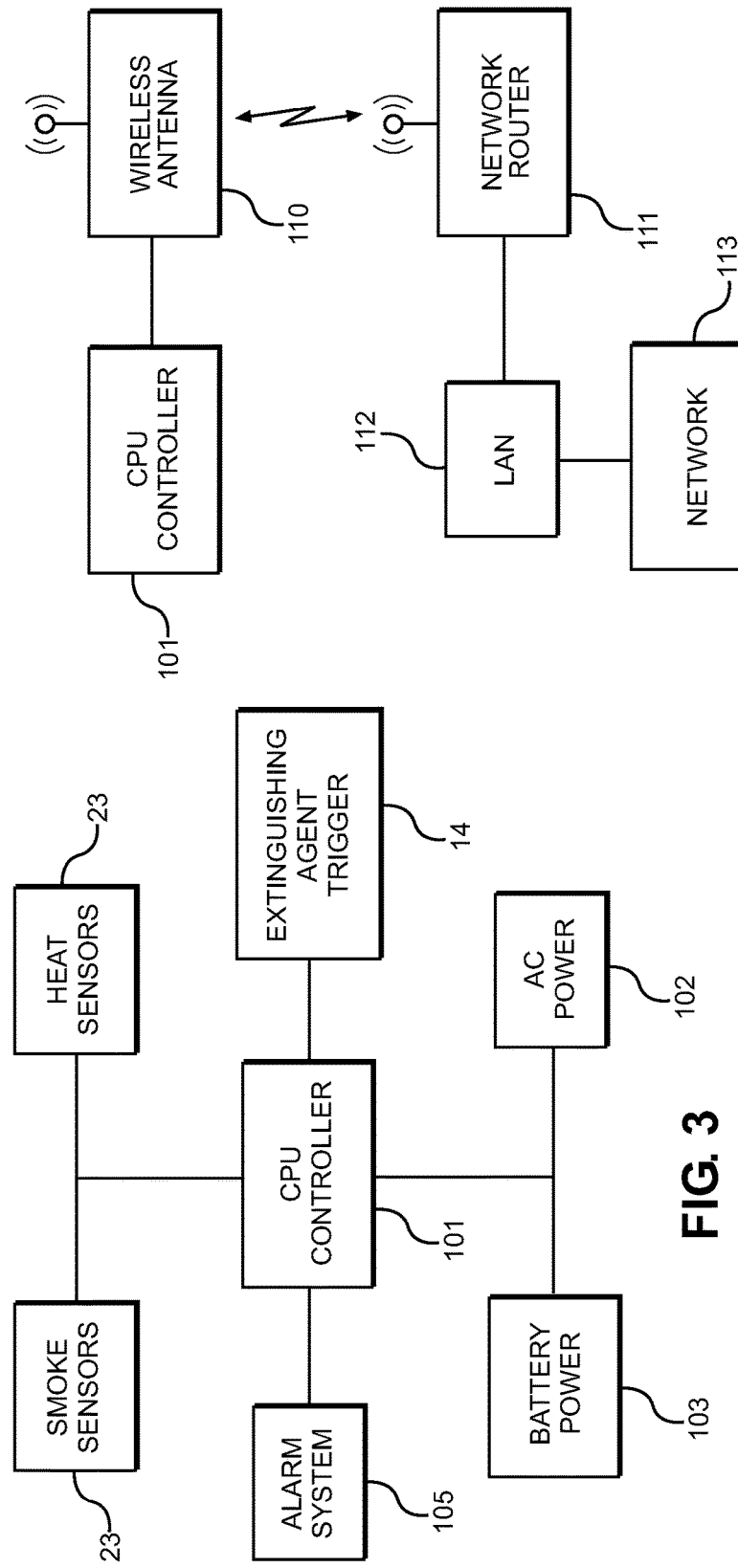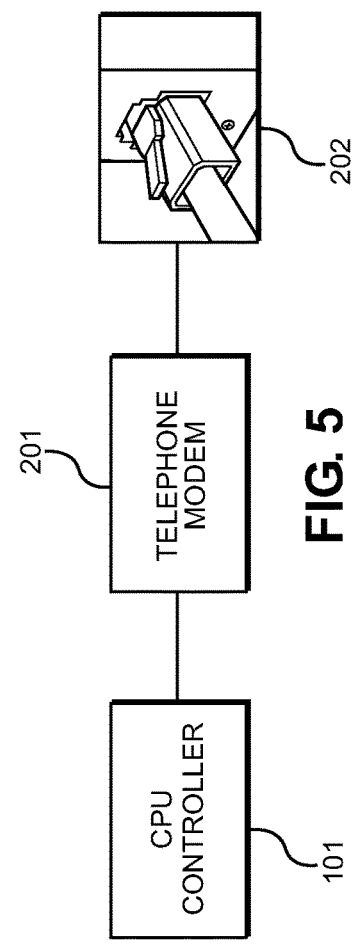

CHRISTMAS TREE FIRE EXTINGUISHING AND ALERT SYSTEM

CROSS REFERENCE TO RELATED APPLICATION

This application claims the benefit of U.S. Provisional Application No. 61/727,156 filed on Nov. 16, 2012, entitled "Christmas Tree Fire Extinguisher." The above identified patent application is herein incorporated by reference in its entirety to provide continuity of disclosure.

BACKGROUND OF THE INVENTION

Field of the Invention

The present invention relates to indoor tree fire extinguishing and monitoring systems for home protection. More specifically, the present invention pertains to a Christmas tree fire extinguishing system that is adapted to be installed within an indoor Christmas tree for monitoring for smoke and fire, for extinguishing the same, and for providing a means of communication to proper authorities and the homeowner in a fire event.

Decorating live pine trees over the Christmas holiday remains a popular option for many families and homeowners. For these families, the smell of a live pine tree in an indoor space and the look of a decorated, live tree engender nostalgia and warm feelings during the holidays. Most often, a live pine tree is cut at the base of its trunk and supported therefrom while a pan of water is introduced to this area in order to maintain the tree over a period of several weeks. The water is absorbed by the tree, preventing its pine needles from rapidly losing their green color and from falling from the tree branches and onto the floor. Providing water to the tree also maintains moisture in the tree and prevents drying out, which ensures the tree does not become an indoor fire hazard.

The primary issue with live trees each holiday season is that many families do not adequately maintain the tree and provide water therefor. The tree quickly dries out and its needles drop to the floor, creating a fire safety concern for the home. Most trees are also heavily decorated with ornaments, garland, and lengths of electrical lighting. This improves the tree's appearance, but also adds to the potential fire hazard if the tree is already ill-maintained by the owner. Any issues with the electrical lighting, such as overheating or spark generation, can quickly create smoking of the tree and even an open flame. This is particularly true during the winter months and in colder climates, where the air is much dryer and static electricity is particularly high. The combination of the dry air, a dry tree, and several fire sources creates a particularly dangerous mix that exposes many homes to fire and property damage.

To address this known concern in the field of Christmas trees, there exist many solutions for detecting and combatting fire that may be generated therefrom. These devices include different types of extinguishing methods, such as water hoses and chemical fire extinguishers, and further include system elements that detect heat or smoke in order to trigger the extinguishing means. While these existing devices address the fire concern, they fall short of ensuring complete protection for the homeowner if the fire that erupts is more than the extinguishing system can handle or spreads to nearby indoor items. What is required is a fire extinguishing system in conjunction with an alert system that can notify a distant homeowner and fire authorities, while also offering a notification of the event to those still in the home by way of a fire alarm.

The present invention is disclosed as a new and novel Christmas tree fire extinguishing system that includes a compressed fire-suppressing agent, along with a system that monitors the tree conditions and offers a means of alerting others of the event. The fire-suppressing agent is held within a housing at the base of the tree, while the system control unit monitors smoke and heat sensors in the tree. A length of fire-retardant hose is routed along the tree trunk, while a plurality of hose nozzles is disposed along the hose length in conjunction with a plurality of sensors adjacent thereto. The system elements include an automated activation means, an audible alarm, a fire alert communication means to local fire authorities and to the homeowner, as well as a backup power source for continued use while deployed. The goal is to improve overall safety of the home and those therein in the event the Christmas tree ignites, whereby the event is addressed directly and alerts are sent to others in case the fire spreads beyond the control of the system.

Description of the Prior Art

Devices have been disclosed in the prior art that relate to fire extinguishing systems. These devices generally relate to systems with fire suppressing agents, fire or smoke detectors, and a system that is adapted to suppress the event if the system is triggered. However, none of the prior art references contemplate a second layer of home protection, wherein a communications system is provided that is activated when the fire suppressant is triggered. This added layer of protection alerts the homeowner that may not be present in the home, audibly alerts those in the home, and sends a distress signal to fire authorities who may then respond or contact the home to inquire if assistance is necessary. The following is a list of devices deemed most relevant to the present disclosure, which are herein described for the purposes of highlighting and differentiating the unique aspects of the present invention, and further highlighting the drawbacks existing in the prior art.

U.S. Pat. No. 5,031,702 to Trumback is one such device that discloses a fire extinguishing system for a Christmas tree, which includes a base that supports the tree and includes a reservoir of water to be utilized in conjunction with a foam material to create the fire extinguishing agent. The water and foam material are mixed using a pump before being dispensed, wherein activation of the system is controlled by a relay connected to a plurality of fire sensors disposed within the tree and connected to the base. While disclosing a means of extinguishing a fire, the Trumback has several drawbacks, including the use of foam as an extinguishing agent, the assembly being utilized to support the tree itself, and further for lacking a means of notifying authorities or the owner in the event of a fire or activation of the system.

Similar to the Trumback device, U.S. Pat. No. 6,003,610 to Kordes discloses a Christmas tree fire extinguishing system that includes a base for supporting the base of the tree, and a pair of flexible extinguisher tubes extending from the base for carrying fire extinguishing foam therefrom. Fire extinguisher canisters excrete the foam material into the tubes upon activation by way of a heat sensor, which actives the system to arrest a fire detected in the tree. Like the Trumback device, the Kordes device has the drawbacks of using a foam extinguishing material, a structure adapted to support the tree, and a capability gap with respect to notifying the homeowner or fire authorities in the event of activation.

Another device U.S. Pat. No. 5,018,586 to Cawley, which discloses an apparatus for suppression of a Christmas tree fire, wherein a canister of fire suppression material is provided that connects to a conduit routed along the tree trunk. A smoke or fire detector is disposed along the conduit, along with a plurality of nozzles for directing the fire suppression material from the conduit. A solenoid valve and an electrical control relay control the application of the fire extinguishing material and control power to the tree. While disclosing a conduit having a multiple nozzles for expelling fire extinguishing material, the Cawley device fails to disclose all elements of the present Christmas tree fire extinguisher system, particularly as it relates to the control and notification means of the system.

Finally, U.S. Pat. No. 7,963,343 to Hopkins discloses a Christmas tree fire extinguishing device that includes a pressurized vessel of fire-retardant that is discharged through a flexible hose and expelled through an outlet adapted to be disposed at the apex of the Christmas tree. An audible alarm is provided, along with a trigger that includes a low-melting point metal alloy that acts as a switch. Once activated, the fire retardant is expelled into the tree from its apex and the alarm is sounded. While the Hopkins device contemplates an audible alarm, it lacks the ability to notify authorities or the homeowner of a trigger event if neither is present at the time of the event.

The present invention is an improvement to those Christmas tree fire extinguishing systems in the art, wherein the present invention contemplates not only a means to combat the fire directly, but a means of communicating to a homeowner and to fire authorities in the event of a fire. It is contemplated that the present invention would decrease the likelihood of fire spreading from a tree fire, while further limiting property damage if the fire were to spread. The ability to quickly communicate to fire authorities and the homeowner allows for swift action to be taken to combat a fire, while the fire suppression system is automatically triggered to cease the fire before it spreads.

It is submitted that the present invention is substantially divergent in design elements from the prior art, and consequently it is clear that there is a need in the art for an improvement to existing Christmas tree fire extinguishing and monitoring systems. In this regard the instant invention substantially fulfills these needs.

SUMMARY OF THE INVENTION

In view of the foregoing disadvantages inherent in the known types of fire extinguishing systems now present in the prior art, the present invention provides a new Christmas tree fire extinguishing and monitoring systems that can be utilized for providing convenience for the user when monitoring a Christmas tree fire, combating an ignited tree, and further for communicating an emergency situation to those in the house and to fire authorities.

It is therefore an object of the present invention to provide a new and improved Christmas tree fire extinguishing and monitoring system that has all of the advantages of the prior art and none of the disadvantages.

It is another object of the present invention to provide a system that monitors the condition of the tree, wherein smoke and/or heat sensors are deployed throughout the tree to monitor for a fire.

Another object of the present invention is to provide a system that includes an automatically triggered fire extinguishing agent that can arrest a fire before it begins to spread and consumes the tree or nearby items.

Yet another object of the present invention is to provide a system that includes an audible alert in the event of a fire, whereby the alert notifies those in the home that a fire may have started and attention is required.

Another object of the present invention is to provide a system that includes a communication means adapted to communicate a distress signal to fire authorities and a notification to the homeowner if the system is triggered and fire is detected.

Another object of the present invention is to provide a system that improves on Christmas tree fire systems by addressing the immediate threat and by notifying the homeowner and proper authorities if the fire system has been triggered.

Another object of the present invention is to provide a system that includes a communication means adapted to function with both telephonic and VOIP phone connections, wherein the system can be deployed in a wired and non-wired configuration and send signals to the homeowner and to 9-1-1 authorities.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 3 shows a schematic view of the system elements within the housing.

FIG. 4 shows a schematic view of the system in a wireless configuration.

FIG. 5 shows a schematic view of the system used in conjunction with a wired telephonic connection.

DETAILED DESCRIPTION OF THE INVENTION

Figure 1:
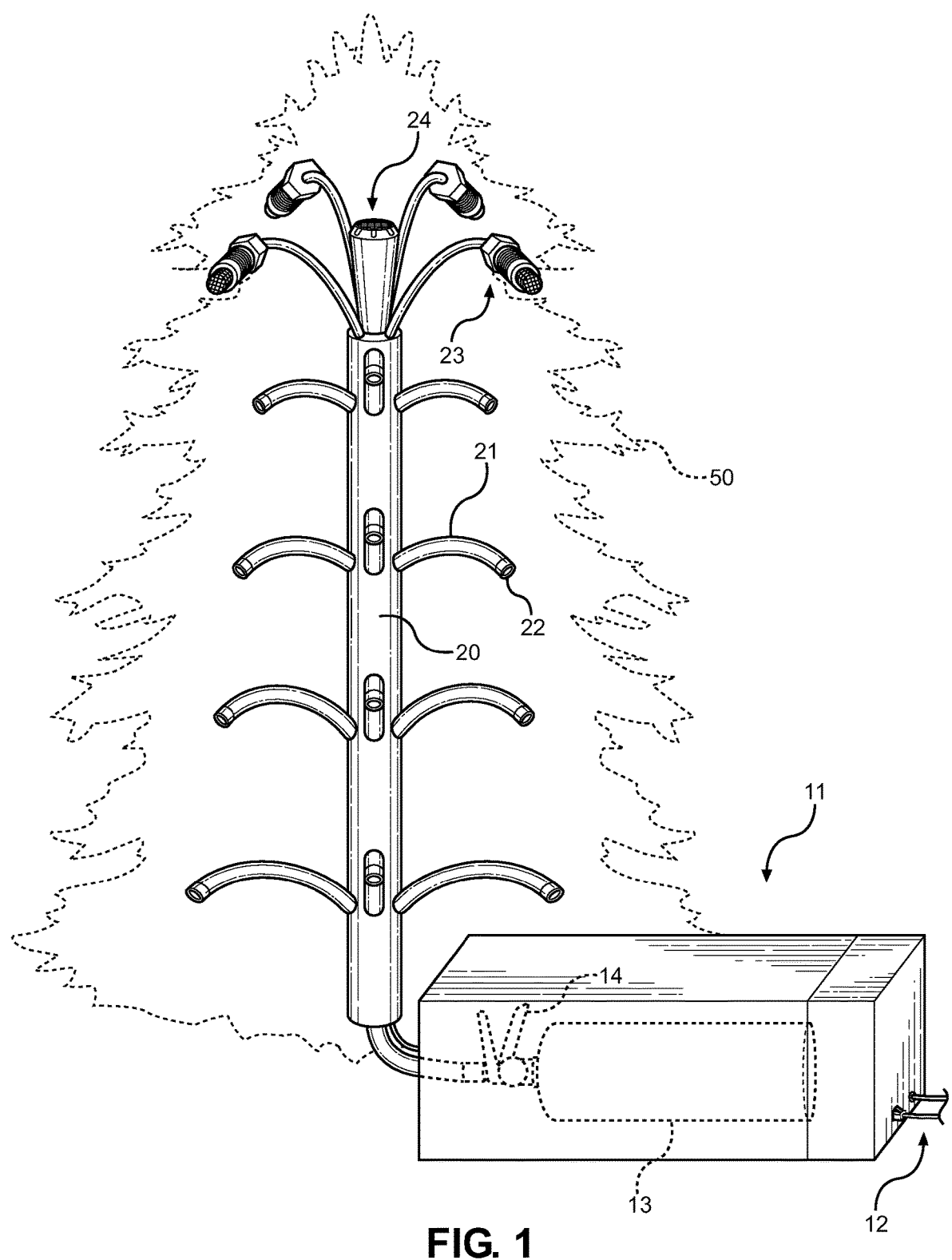
FIG. 1 shows a view of the fire extinguishing and monitoring elements of the present invention in a working state, positioned within a Christmas tree and monitoring smoke and heat therefrom.

Reference is made herein to the attached drawings. Like reference numerals are used throughout the drawings to depict like or similar elements of the Christmas tree fire extinguishing and monitoring system. For the purposes of presenting a brief and clear description of the present invention, the preferred embodiment will be discussed as used for monitoring and preventing Christmas tree fires and for alerting owners and authorities of a fire event. The figures are intended for representative purposes only and should not be considered to be limiting in any respect.

Referring now to FIG. 1, there is shown a view of the fire extinguishing system of the present invention in a working state, whereby the system monitors the condition of the Christmas tree 50 and can activate a fire extinguishing agent 13 from within a housing 11 placed below the tree 50. Positioned within the tree 50 and along its trunk is a conduit 20 that routes a plurality of hoses 21 and a plurality of electrical connections through the tree 50. The hoses are preferably a heat-resistant material that are adapted to carry a pressurized fire extinguishing agent from the agent canister 13 to the tree 50 for dispensing the same therein to combat an open fire. The fire extinguishing agent travels through the conduit 20 within a central line and into the individual hoses 21 disposed along the conduit 20 length. The fire extinguishing agent then exits the nozzles 22 of the hoses 21 to cover the tree 50 with the agent and smother any fire emanating therefrom.

Electrically connected to the housing 11 and extending from the conduit 20 is a plurality of fire sensors 23 and an audible warning means 24. The fire sensors 23 comprise electrical smoke and/or heat sensors that communicate to a controller within the housing 11 and act to monitor the tree 50 for smoke and/or flames. When a fire condition is detected, the controller receives signals from the sensors 23 and thereafter activates a trigger 14 that releases the fire extinguishing agent 13. The sensors 23 may be disposed along the upper portion of the tree 50, along the length of the conduit 20, and in any configuration that is best suited for monitoring the tree 50 as a whole and for detecting a fire or smoke event.

The housing 11 includes the fire extinguishing agent and the electronics utilized to operate the present system. The housing may be electrically connected 12 to external power and to external communication lines for operation, or the system may be designed to operate wirelessly. Using a wired connection 12, the system may receive AC power from a household electrical outlet, and can further be connected to a communications system via a telephonic landline wire or to a Voice Over IP (VOIP) network via an Ethernet connector. It is desired that the present system be designed to be either wired or wireless, and one that can achieve communication with the outside world via traditional landlines or a VOIP connection.

Figure 2:
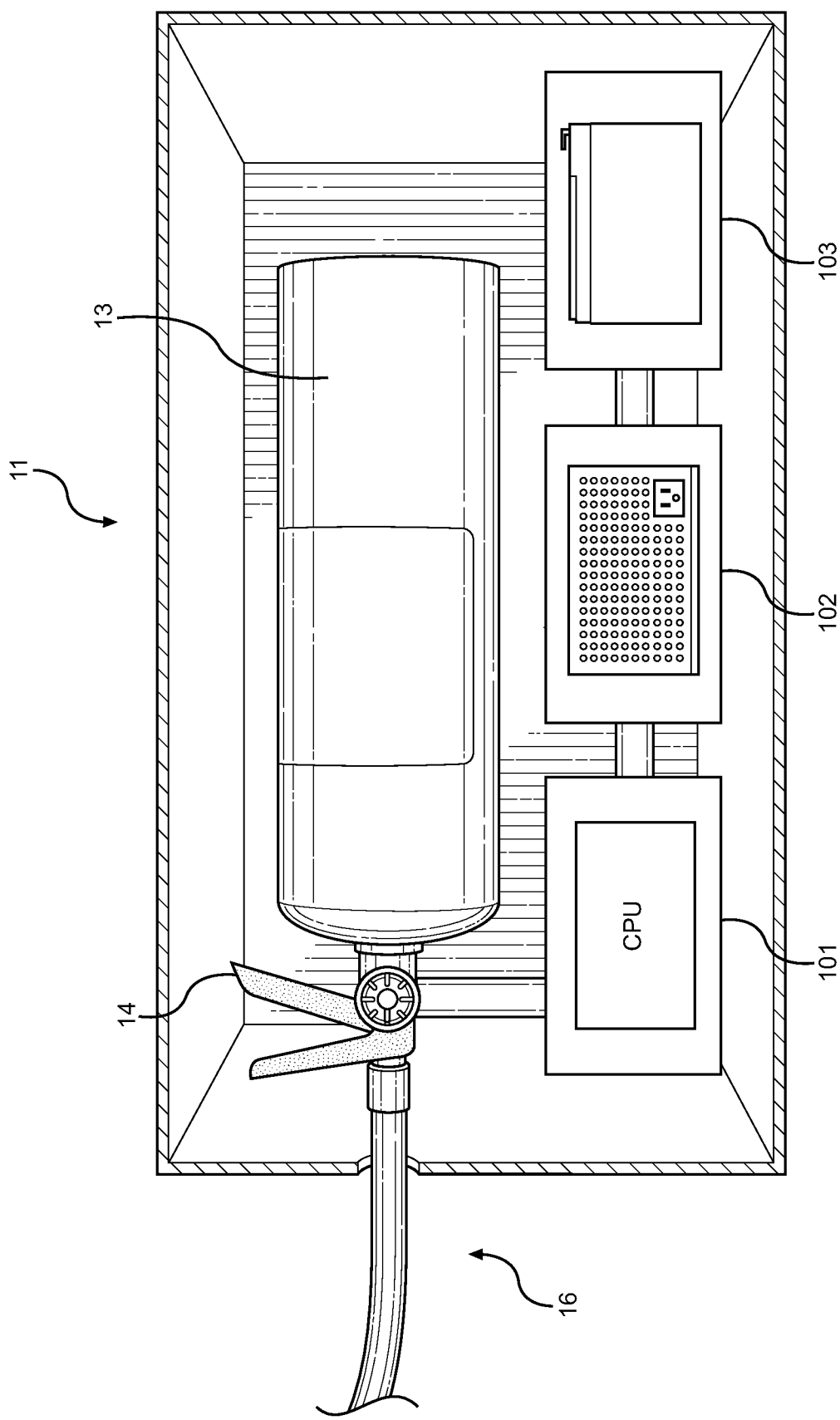
FIG. 2 shows an internal view of the system housing, which includes the fire extinguishing agent and the electrical system elements for system operation and communication with outside parties.

Referring now to FIG. 2, there is shown a cut-away view of the housing 11 and a schematic view of its internal components. The housing 11 is an enclosure adapted to be placed at the base of the Christmas tree, wherein the housing 11 includes the pressurized fire extinguishing agent 13 and the electrical control unit 101 of the system that controls operation of the system and release of the fire extinguishing agent 13. There may also be a manual release trigger 14 for manually releasing the agent in the event of an emergency. The control unit 101 receives signals from the fire/smoke sensors, processing their signals and coordinates the fire extinguishing activities and communication of the system when deployed. The control unit 101 receives power either from an AC power connection 102 or from onboard battery power 103, wherein the battery 103 may be supplied as a backup to the AC connection 102. Upon activation of the fire extinguishing agent 13, the pressurized agent is released through a hose 16 to the conduit and out through the nozzles.

The control unit 101 receives signals from the sensors within the tree, wherefrom actions can be taken and the system can release the fire extinguishing agent 13 and notify the authorities of a trigger event. To trigger the canister of agent 13, the control unit 101 operates a relay or solenoid that releases the pressurized agent. At the same time, the control unit 101 activates the audible alarm to warn occupants of the household and triggers a distress call to local authorities and the homeowner via phone message. The fire extinguishing agent may consist of one of the following agents: dry powder agent, foam agent, water, or carbon dioxide. The agent is released from the nozzles and into the tree interior for end a fire and ceasing its spread.

Referring now to FIG. 3, there is shown a schematic view of the system elements of the present fire monitoring and extinguishing system. The system comprises a controller unit 101 that receives and transmits signals to different system elements during operation. The controller unit 101 is an analog or digital circuit (e.g. logic circuit, microprocessor, etc.) that is capable of interpreting signals from the heat and smoke sensors 23 and initiating the alarm 105 and fire extinguishing agent 14 if a fire starts in the tree. The controller unit 101 is preferably a digital circuit that includes a processing means, a memory, a storage means, and connections to the various system elements for operation of the same. The controller unit 101 exercises code based on the electrical inputs from the sensors 23, whereby a signal can be sent to the audible alarm 105 and a solenoid or relay can trigger the fire extinguishing agent 14. The audible alarm 105 preferably comprises a speaker and a sound generator that creates a high pitched alarm similar to that found in most household fire alarms. Powering the system is preferably an AC power connection 102 and battery backup power 103.

Referring now to FIGS. 4 and 5, there are shown two embodiments of the communication means of the present invention, wherein a wireless communications system and a landline connection are provided. The control unit 101 of the present invention is supported within the housing of the system. In a wireless configuration, the housing further includes connection to or integration of a wireless antenna 110 that can wirelessly communicate to a network router 111 within the home. The router 111 connects to the local area network 112, which connects to a larger network 113 (e.g. the internet). Through this connection, connection to a Voice over IP (VOIP) connection can be established between the control unit 101 and a VOIP service provider 114. The service provider 114 can then establish a connection with 9-1-1 services or another recipient. In this way, a distress message can be sent to fire authorities and/or the homeowner if the system is triggered.

FIG. 5 represents a landline connection between the control unit 101 and the end recipient of the distress message. The control unit connects to a telephone modem 201, which connects to a telephonic landline connection 202 for establishing an outgoing call to fire authorities or the homeowner.

In either embodiment, the present invention contemplates a Christmas tree fire monitoring and extinguishing system that not only stops the fire before it spreads, but also alerts others of the event. The alert includes both a local, audible alarm, and a communication means that establishes an alert for those not in the immediate area (fire department, homeowner, etc.). The system includes smoke and fire sensors that are supported within the tree interior by way of a flexible, flame retardant hose having a plurality of nozzles spaced therealong for dispensing the fire extinguishing agent when the system is triggered. The device further includes a communication means (e.g. a phone modem or network connection) for calling the fire department, police, or owner in the case of a fire. If fire or smoke is detected, the alarm is activated, and the fire extinguishing agent is released through the nozzles to extinguish the fire. The device can then alert the authorities and owner of the fire. The present invention detects and responds to increased temperatures before a fire can spread, thereby reducing the safety hazards associated with putting lights on live pine trees.

The conduit, extinguishing agent nozzles, and sensors of the present invention are supported within a Christmas tree in order to both detect and extinguish fires. The system includes smoke and fire sensors that connect to the control unit via a flame retardant cord. An audible alarm creates a high-pitched sound or voice alerts when extreme heat or smoke is detected. The hose can be constructed of a clear, flexible material, and can come in three pieces so the user can adjust the length to better suit a particular tree. The device can further include a plurality of nozzles attached to the sensors at the end of the hose. Each nozzle end and connector piece is made of brass, steel or another suitable material, and includes a screw-on cap to work properly with the pressure of the extinguisher. The fire extinguisher is 3 or 5 pounds and is supported within the housing at the base of the tree.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A Christmas tree fire extinguishing and alert system, comprising:
    a housing supporting a pressurized fire extinguishing agent;
    a trigger for releasing said fire extinguishing agent from said housing;
    a conduit adapted to be mounted within a tree having a plurality of hoses extending from the conduit wherein each hose has at least one nozzle for dispensing said fire extinguishing agent when released;
    a plurality of fire sensors adapted to be disposed within said tree;
    an audible alarm;
    a power source;
    a control unit electrically connected to said fire sensors, said audible alarm, said trigger, and said power source;
    said control unit adapted to receive signals from said sensors and activate said trigger if a fire is detected;
    a communicator electrically connected to said control unit and adapted to send a distress message via a telecommunications network upon detection of a fire.

2. The system of claim 1, wherein the communicator is comprised of a telephonic landline connection.

3. The system of claim 1, wherein the communicator is comprised of a Voice over IP connection.

4. The system of claim 1, wherein said control unit wirelessly connects to said communicator.

5. The system of claim 1, wherein said fire sensors comprise smoke and heat sensors.

6. The system of claim 1, wherein said audible alarm comprises a speaker and a sound generator.

7. The system of claim 1, further comprising a manual release of said fire extinguishing agent in conjunction with said trigger.

8. The system of claim 1, wherein said power source comprises an AC connection with battery backup.

* * * * *